Dec. 15, 1936.  P. H. FRANK  2,064,741
ROLLING MILL BEARING
Filed May 27, 1935  2 Sheets-Sheet 1
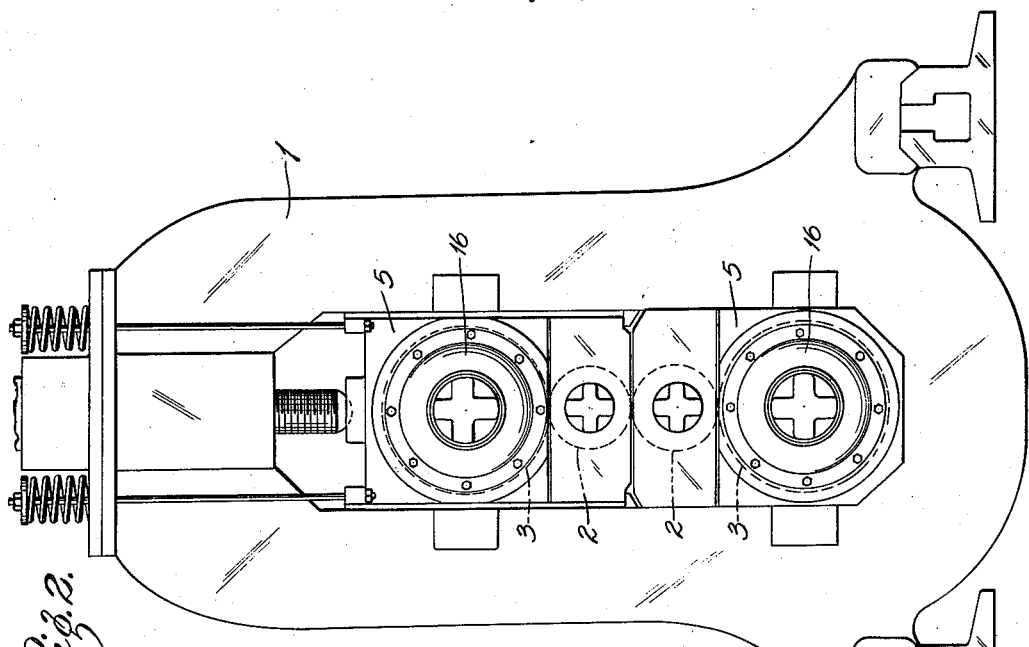
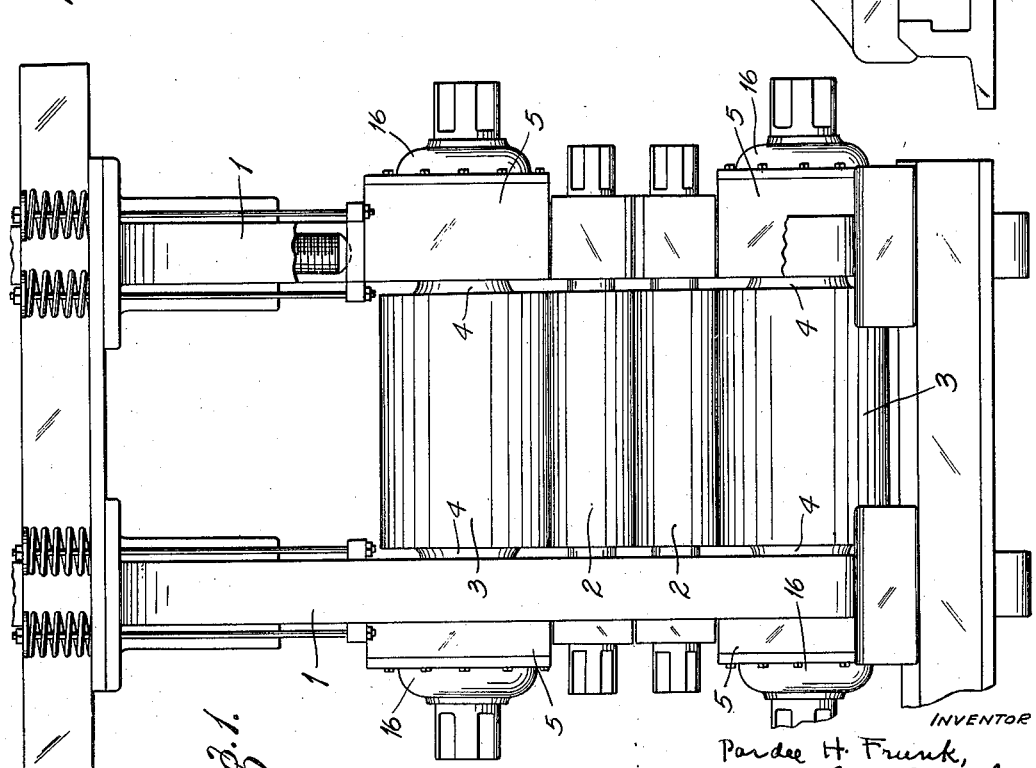
INVENTOR
Pardee H. Frank,
by Carr Carr & Gravely,
HIS ATTORNEYS.

Dec. 15, 1936.                P. H. FRANK                2,064,741
                         ROLLING MILL BEARING
                    Filed May 27, 1935          2 Sheets-Sheet 2
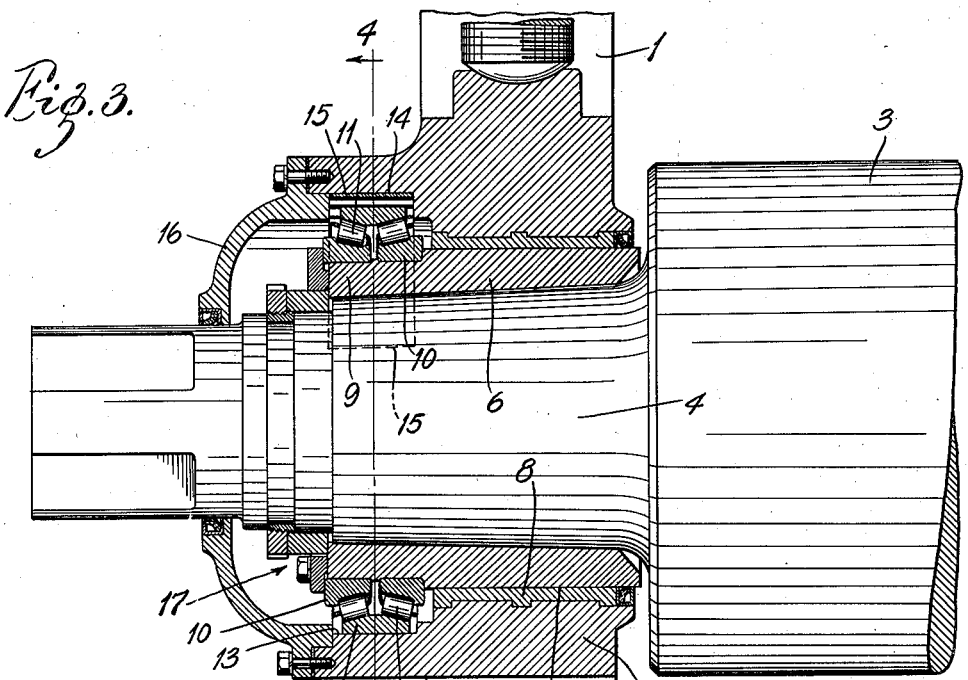
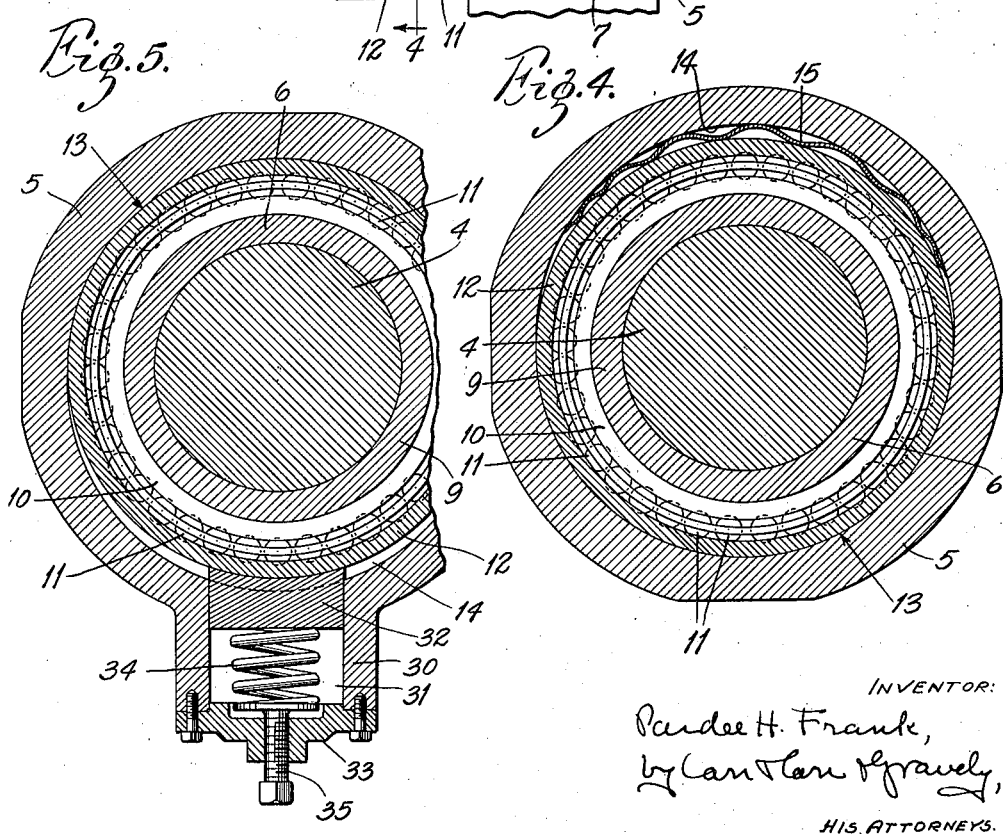
INVENTOR:
Pardee H. Frank,
by Carr Carr & Gravely,
HIS ATTORNEYS.

Patented Dec. 15, 1936

2,064,741

UNITED STATES PATENT OFFICE 2,064,741

ROLLING MILL BEARING

Pardee H. Frank, Canton, Ohio, assignor to The Timken Roller Bearing Company, Canton, Ohio, a corporation of Ohio Application May 27, 1935, Serial No. 23,700

5 Claims. (Cl. 80—55)

My invention relates to rolling mills, particularly to mills of the 4-high type, wherein a back-up roll is provided for each of the work rolls. The invention is concerned with the bearings for such back-up rolls; and it has for its principal object to combine a taper roller bearing with the usual plain bearing and to provide means whereby the plain bearing carries the radial load when the mill is in operation and the roller bearing withstands end thrust at all times and also carries radial load when the mill is starting or when it is running idle, that is without any work passing therethrough. Other objects and advantages of the invention will appear hereinafter.

The invention consists principally in a combined plain and taper roller bearing for such mill rolls wherein the taper roller bearing is provided with a resilient seat above or below it, such seat permitting bodily movement of the bearing when the rolls are under load. The invention further consists in the rolling mill bearing and in the parts and combinations and the arrangement of parts hereinafter described.

In the accompanying drawings wherein like reference numerals indicate like parts wherever they occur, Fig. 1 is a diagrammatic elevation of a 4-high rolling mill whose back-up rolls are provided with bearings embodying my invention, Fig. 2 is a diagrammatic end elevation, Fig. 3 is a longitudinal sectional view through the bearings and housing of the upper back-up roll, Fig. 4 is a cross sectional view on the line 4—4 in Fig. 3, and Fig. 5 is a cross sectional view similar to Fig. 4, but showing the bearing of the lower back-up roll and also showing a modified form of resilient support.

In the drawings is illustrated a 4-high sheet rolling mill of a common type including a frame 1 in which are mounted the two work rolls 2 and the two back-up rolls 3 therefor, said rolls being disposed in vertical alinement and having bearings mounted in housings in said frame.

Each back-up roll 3 has at each end a tapered neck portion 4 that projects into its bearing housing 5. On said tapered neck portion 4 is mounted a sleeve 6 which has a cylindrical outer peripheral portion 7 constituting a journal cooperating with a bushing 8 mounted in said housing 5. Said sleeve has a portion 9 of reduced diameter outwardly of said journal portion 7 and mounted thereon are the cones 10 or inner bearing members of a double row taper roller bearing. The two series of conical rollers 11 on said bearing cones cooperate respectively with the raceway portions of a doubly tapered cup 12 or outer bearing member which is seated in said housing.

The bore 13 in which said bearing cup 12 is seated is provided with an enlarged portion 14 above the bearing cup 12, said enlarged portion gradually increasing in size from its edges to the middle, that is, being of largest size directly above the bearing cup. Seated in said enlarged recess 14 is a sinuous spring 15 which bears against the enlarged bore 14 of said housing and the outer periphery of the upper portion of said cup 12.

The end of the back-up roll 3 projects beyond the housing 5 and a suitable closure member 16 is provided for the end of the housing. Likewise, suitable fastening means 17 are provided for holding the sleeve and the taper roller bearing in position.

The resilient support for the lower back-up roll is mounted below its bearing cup, as is illustrated in Fig. 5. In said Fig. 5 is shown a modified form of resilient support, including a hollow boss 30 that communicates with the enlarged bore 14 of said housing. Mounted in the bore 31 of said boss 30 is a block 32 that is shaped to conform to the outer periphery of the bearing cup 12. A cap 33 is provided for the end of the boss and a spring 34 is interposed between said block and said cap, a suitable adjusting screw 35 being provided for said spring.

By the above arrangement, a radial load on the back-up rolls during normal operation of the mill is very largely, if not entirely, carried by the plain bearings; since the application of load to the back-up rolls results in the taper roller bearings being moved vertically out of radial load carrying position against their spring mountings (the bearing of the upper back-up roll moving upwardly, and that of the lower back-up roll moving downwardly). Said taper roller bearings withstand any end thrust on said back-up rolls. When the mill is not running or when there is no work passing through it, the springs will force the taper roller bearings into position to carry radial load, thereby partly or wholly relieving the plain bearings of such radial load. Thus, when the mill is not running, the carrying of the load by the taper roller bearings prevents the oil from being squeezed out of the plain bearings, thus minimizing the danger of damaging said plain bearings when the mill is started.

It is obvious that the foregoing and other advantages are not dependent on the precise details of construction shown herein, but follow from the provision of a resilient seat disposed vertically with respect to the taper roller bearing of a combined taper roller and plain bearing for a mill roll. Accordingly, I do not wish to be limited to the precise construction shown.

What I claim is:

1. A mill roll bearing comprising a plain bearing for carrying radial load, an antifriction bearing adjacent to said plain bearing adapted to resist end thrust and carry radial load, a housing for said bearings, and a resilient support for said antifriction bearing in said housing placed vertically with respect to said bearing.

2. A mill roll bearing construction comprising a bearing housing, a mill roll having a journal extending into said housing, a bushing in said housing for a portion of said journal, an antifriction bearing interposed between said housing and said journal adjacent to said bushing and a resilient support for said antifriction bearing in said housing.

3. A mill roll bearing construction comprising a bearing housing, a mill roll having a tapered neck extending into said housing, a sleeve on said neck having a tapered bore and a cylindrical outer peripheral portion constituting a journal, a bushing in said housing for said journal, a taper roller bearing interposed between said sleeve and said housing adjacent to said bushing and a resilient support for said roller bearing in said housing.

4. A mill roll bearing construction comprising a bearing housing, a mill roll having a journal extending into said housing, a bushing in said housing for a portion of said journal, a taper roller bearing interposed between said journal and said housing adjacent to said bushing and a resilient support for said roller bearing in said housing, vertically placed with respect to said bearing.

5. A mill roll bearing construction comprising a bearing housing, a mill roll having a tapered neck extending into said housing, a sleeve having a tapered bore fitting said neck, said sleeve having a cylindrical outer peripheral portion constituting a journal, and a portion of reduced diameter adjacent to the outer end of said journal, a bushing in said housing for said journal, a duplex taper roller bearing interposed between said housing and said reduced portion of said sleeve and a resilient support for said roller bearing in said housing vertically placed with respect to said bearing.

PARDEE H. FRANK.